US008578160B2

(12) United States Patent
Applin et al.

(10) Patent No.: US 8,578,160 B2
(45) Date of Patent: Nov. 5, 2013

(54) SCAN-TO-HOME METHOD AND SYSTEM FOR THE DELIVERY OF ELECTRONIC DOCUMENTS TO A USER HOME DIRECTORY

(75) Inventors: Amanda L. Applin, Pittsford, NY (US); Parul Patel, Fairport, NY (US); Michael W. Barrett, Fairport, NY (US); Michael Wang, Macedon, NY (US); Cynthia Lambert Moskal, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 1313 days.

(21) Appl. No.: 11/803,748

(22) Filed: May 15, 2007

(65) Prior Publication Data

US 2008/0289014 A1 Nov. 20, 2008

(51) Int. Cl.
*H04L 29/06* (2006.01)
*G06F 21/00* (2013.01)

(52) U.S. Cl.
USPC ............................................. 713/168; 726/5

(58) Field of Classification Search
None
See application file for complete search history.

(56) References Cited

U.S. PATENT DOCUMENTS

| 7,139,094 B2 | 11/2006 | Blasio et al. ................. 358/1.16 |
| 2003/0043416 A1 | 3/2003 | Rublee et al. ................. 358/402 |
| 2003/0046445 A1 | 3/2003 | Witt et al. ..................... 709/321 |
| 2006/0109518 A1 | 5/2006 | Martin et al. ................. 358/402 |
| 2006/0230286 A1* | 10/2006 | Kitada ........................... 713/186 |
| 2006/0256392 A1* | 11/2006 | Van Hoof et al. ............. 358/402 |

OTHER PUBLICATIONS

Guide to Accessing ISS Home and Shared Directories Using FTP, Information Systems Services; University of Leeds, Sep. 2005, Edition 1.2, Document Ref: HOW 32 ScanFlowStore: Scan your way to an organized office; Xerox Document Scanning Services; University of Washington; Computer Science and Engineering Scan to PC Desktop Professional Workgroup Edition v8; Xerox.

* cited by examiner

*Primary Examiner* — Gilberto Barron, Jr.
*Assistant Examiner* — Izunna Okeke
(74) *Attorney, Agent, or Firm* — Kermit D. Lopez; Luis M. Ortiz; Ortiz & Lopez, PLLC

(57) ABSTRACT

A method and system for efficiently and securely permitting a user to scan electronic documents from a remote multi-function device to a user's home directory. A user can be authenticated via the multi-function device and electronic credentials associated with the user generated, which are utilized to determine the user's home directory. The multi-function device can then produce a customized template that can be selected by the user when accessing rendering/scanning services. The user can then scan a document and electronically store such a document at the home directory via an SMB (Server Message Block) protocol. Home directories can either be determined via an LDAP (Lightweight Directory Access Protocol) or configured on a network interface via a default directory path and the user name.

14 Claims, 3 Drawing Sheets

SCAN-TO-HOME METHOD AND SYSTEM FOR THE DELIVERY OF ELECTRONIC DOCUMENTS TO A USER HOME DIRECTORY

TECHNICAL FIELD

Embodiments are generally related to data-processing methods and systems. Embodiments are also related to rendering devices and image-processing methods and systems. Embodiments are further related to network scanning systems. Embodiments are additionally related to techniques for the delivery of scanned documents to a particular user-designated directory.

BACKGROUND OF THE INVENTION

Many processes can be employed for generating an electronic image of a document for later retrieval through a network connection. Conventional rendering devices can be utilized to scan a document and generate an electronic image. Such devices may also be utilized to store the electronic image at a system-designated location, and provide information relating to the system-designated location to the user who scanned the document.

One of the important requirements involved in scanning and rendering documents is the ability to permit a scanned document to be accessible from a user's workstation. Prior art scanning and rendering methods and systems allow a user to transfer a document electronically from a multi-function device to a user's desktop, and then designating such a document as a "Scan-to-Email" document wherein the scanned document is transferred via SMTP (Simple Mail Transfer Protocol) to a user's email inbox. A scan distribution status allows users to keep track of the scanned documents released for distribution to email recipients, reducing the chance of misdirected or undelivered files.

"Scan-to-File" can be employed in situations where the scanned document is transferred to a specified file server and a user accesses the file server to retrieve the electronic file. Another method involves scanning to a PC (Personal Computer) desktop. In such a situation, the scanned document can be transferred to a specified file server. A retrieval application monitors the file server and opens electronic file on the user's desktop.

Many network multifunction devices utilize Push/Pull processes to bring scanned images from the device to a local desktop. The term "Push" means first scanning the document to a mailbox, which can be a hard drive located on the computing device or a network server. "Pull: means that the user then must actually return to the desktop computing device, log into the mailbox, find the scanned image and then manually "pull" it back to the directory or file folder. An image retriever completely automates the process so that each new scanned image can be found on the user's desktop.

One of the problems with such prior art techniques is a lack of user authentication and security. Accordingly a need exists for a an improved rendering feature that provides a very simple and secure way to scan documents from a device to a user's home directory without any additional server software and which works with user authentication.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved system and method for rendering documents.

It is another aspect of the present invention to provide for an improved network scanning system providing a scanning workflow.

It is a further aspect of the present invention to provide for a method to scan documents from a multifunction device to a user's home directory without any additional server software.

The aforementioned aspects and other objectives and advantages can now be achieved as described herein. An electronic document storage and rendering method and system. A user can be authenticated and electronic credentials associated with the user. Thereafter, a template can be created based on said electronic credentials, if said user is authenticated, wherein said template is graphically displayable as a single template in a display area of a user interface. Such a template permits said user access to a home directory for storing an electronic document provided said user. Finally, the electronic document can be automatically delivered to and stored in said home directory, in response to a selection of said single template by said user utilizing said user interface.

Such a method and system provides a scan-to-home solution for delivering a scanned document to a user's home directory. The user authenticates to a multi-function device with a login name and password. The authenticated user's credentials are utilized to create a template (selection on a local user interface) and to login to the directory for storing the electronic file. A single template, updated with the authenticated user's information can be displayed prominently on the local user Interface. The user can then select the "Scan-to-Home" template, press a "start" button and the document is stored electronically in the user's home directory.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
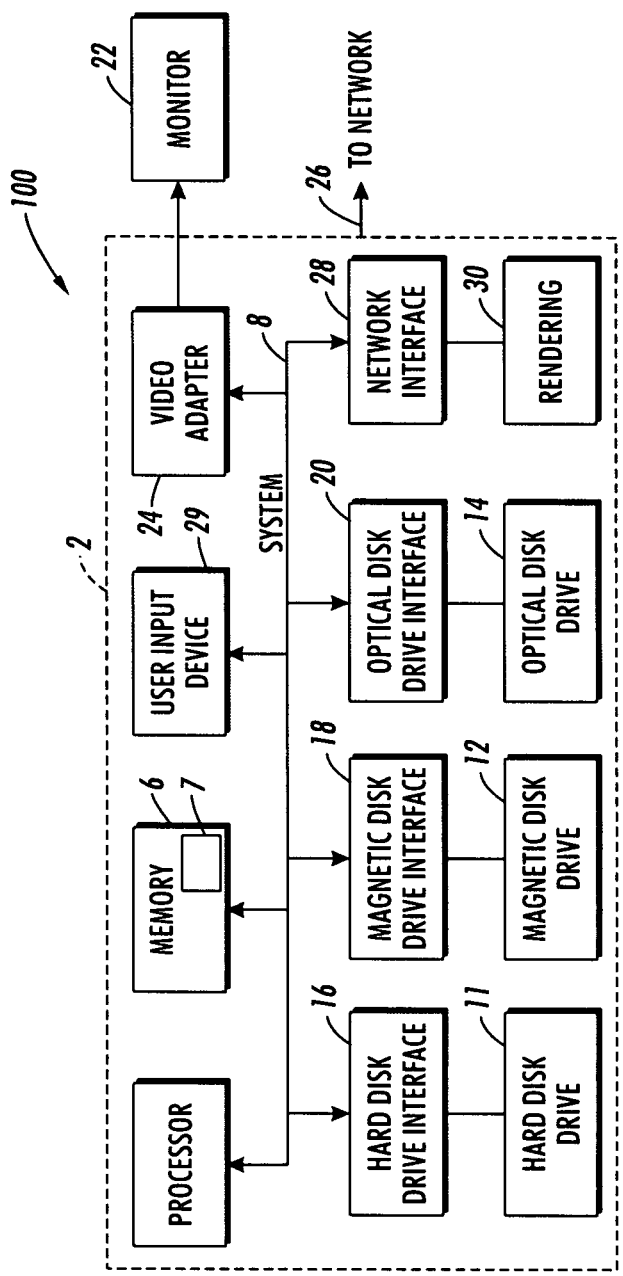
FIG. 1 illustrates a block diagram of a data-processing apparatus, which can be adapted for use in implementing a preferred embodiment.

FIG. 1 illustrates a block diagram of a data-processing apparatus 10, which can be utilized to implement a preferred embodiment. Data-processing apparatus 10 can be used to implement a method for scanning documents from a multi-function device to a home directory without the use of additional server (e.g., middleware) software. Data-processing apparatus 10 can be configured to include a general purpose computing device, such as a computer 2. The computer 2 includes a processing unit 4, a memory 6, and a system bus 8 that operatively couples the various system components to the processing unit 4. One or more processing units 4 operate as either a single central processing unit (CPU) or a parallel processing environment. Data-processing apparatus 10 represents only one of many possible data-processing devices or systems for implementing embodiments. Data-processing apparatus 10 can be provided as a stand-alone personal computer, portable/laptop computer, PDA (personal digital assistant), server, mainframe computer, and so forth.

The data-processing apparatus 10 generally includes one or more data storage devices for storing and reading program and other data. Examples of such data storage devices include a hard disk drive 11 for reading from and writing to a hard disk (not shown), a magnetic disk drive 12 for reading from or writing to a removable magnetic disk (not shown), and an optical disc drive 14 for reading from or writing to a removable optical disc (not shown), such as a CD-ROM or other optical medium. A monitor 22 can be connected to the system bus 8 through an adapter 24 or other interface. Additionally, the data-processing apparatus 10 can include other peripheral output devices (not shown), such as speakers, printers, scanners, copiers, multi-function rendering devices and so forth. For example, a user input device 29, such as a mouse, keyboard, and so forth, can be connected to system bus 8 in order to permit a user to enter data to and interact with data-processing apparatus 10.

The hard disk drive 11, magnetic disk drive 12, and optical disc drive 14 are connected to the system bus 8 by a hard disk drive interface 16, a magnetic disk drive interface 18, and an optical disc drive interface 20, respectively. These drives and their associated computer-readable media provide nonvolatile storage of computer-readable instructions, data structures, program modules, and other data for use by the data-processing apparatus 10. Note that such computer-readable instructions, data structures, program modules, and other data can be implemented as a module or group of modules, such as, for example, module 7, which can be stored within memory 6.

Note that the embodiments disclosed herein can be implemented in the context of a host operating system and one or more module(s) 7. In the computer programming arts, a software module can be typically implemented as a collection of routines and/or data structures that perform particular tasks or implement a particular abstract data type. Module 7 can, for example, implement the method 400 described and illustrated herein with respect to FIG. 4.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 10, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links. Module 7, for example, can be executed by the data-processing apparatus 10, such that the module 7 (or a group of such modules) and the data-processing apparatus 10 are operable in combination with one another to perform the various instructions and logical operational steps of method 400 described and illustrated herein with respect to FIG. 4, or variations to the method 400.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules can be stored or encoded in a machine readable medium such as the hard disk drive 11, the, magnetic disk drive 12, the optical disc drive 14, ROM, RAM, etc or an electrical signal such as an electronic data stream received through a communications channel. These program modules can include an operating system, one or more application programs, other program modules, and program data.

The data-processing apparatus 10 can operate in a networked environment using logical connections to one or more remote computers (not shown). These logical connections are implemented using a communication device coupled to or integral with the data-processing apparatus 10. The data sequence to be analyzed can reside on a remote computer in the networked environment. The remote computer can be another computer, a server, a router, a network PC, a client, or a peer device or other common network node. FIG. 1 depicts the logical connection as a network connection 26 interfacing with the data-processing apparatus 10 through a network interface 28. Such networking environments are commonplace in office networks, enterprise-wide computer networks, intranets, and the Internet, which are all types of networks.

It will be appreciated by those skilled in the art that the network connections shown are provided by way of example and that other means of and communications devices for establishing a communications link between the computers can be used. Note that the network interface 28 may also communicate with a rendering device 30, which may be, for example, a printer, scanner, copier, multi-function device and the like.

Figure 2:
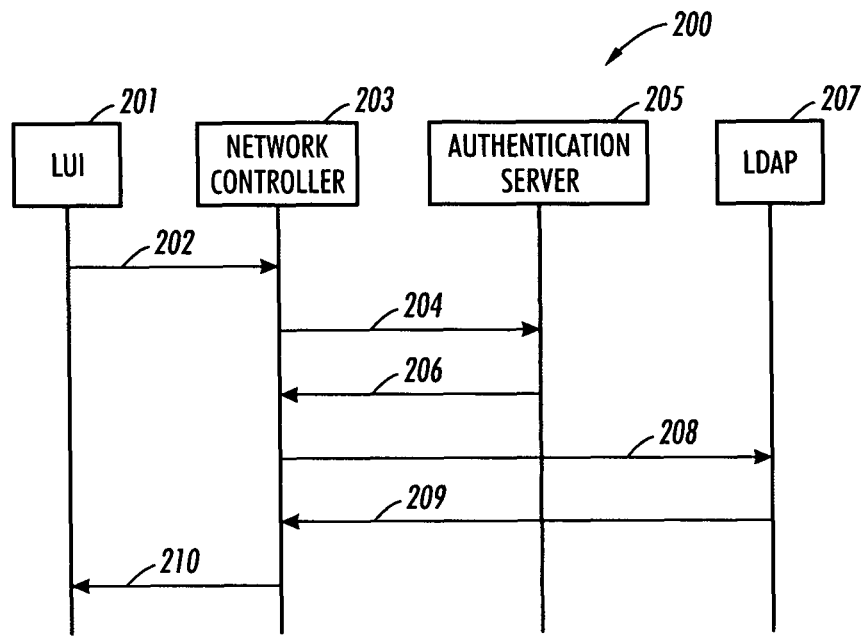
FIG. 2 illustrates a functional block diagram indicating the workflow of a Scan-to-Home system, which can be implemented in accordance with a preferred embodiment.

FIG. 2 illustrates a functional block diagram depicting the general workflow of a scan-to-home system 200, which can be implemented in accordance with a preferred embodiment. The scan-to-home system 200 depicted in FIG. 1 generally includes four functional components, including an LUI (Local User Interface 201), a network controller 203, an authentication server 205, and an LDAP (Lightweight Directory Access Protocol) server 207. In general a user may access the system 200 utilizing the LUI 201. The network authentication required for a scan-to-home solution can be achieved via a network controller 203.

In the workflow of system 200, the user can submit credentials 202 and the authentication server 205 can authenticate the user credentials 202 via a login process 204. The login process 204 produces results 206, which can be utilized to authenticate the user to a particular device (not shown in FIG. 2). The customer environment employs an LDAP server 207. The user's credentials 202 can be utilized to access a home directory (not shown in FIG. 2) by sending a query to the LDAP server 207 as indicated by arrow 208.

The authenticated user's credentials 202 can be employed to retrieve the home directory defined in the LDAP 207 as indicated by arrow 209. The device creates a scan-to-home template 210 with the authenticated user's home directory as the file destination. A single scan-to-home template 210 can be employed for all users. The scan-to-home template 210, however, can be populated with the information specific to the currently authenticated user. A simple workflow can be created for the user by avoiding the need to parse through a list of templates for the user's personal template.

Figure 3:
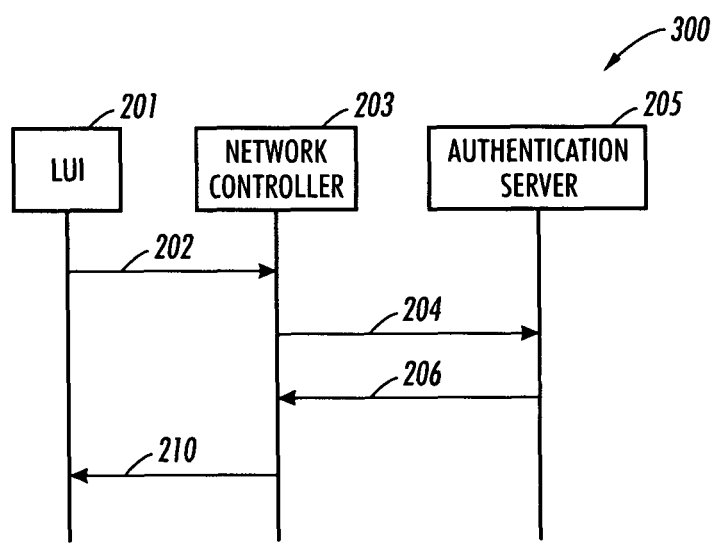
FIG. 3 illustrates a block diagram indicating workflow of a Scan-to-Home system, which can be implemented in accordance with an alternative embodiment.

FIG. 3 illustrates a block diagram indicating workflow of a scan-to-home system 300, which can be implemented in accordance with an alternative embodiment. Note that in FIGS. 1-3, identical or similar parts or elements can be implemented in accordance with identical reference numerals. Here, the customer's environment does not utilize an LDAP server 207. The network home path can be defined utilizing a device web user interface or SNMP. The user's login name can be appended to the network home path defined by network controller 203 to create the scan-to-home template 210 for file destination. Note that the LDAP server 207 can be provided by a data-processing apparatus, such as apparatus 10 described and illustrated earlier herein. Similarly, the authentication server 205 can be implemented or provided by a device such as apparatus 10.

Alternatively, the LDAP server 207 and the authentication server 205 can communicate with apparatus 10 through a computer network and apparatus 10 may be connected to and communicate with a multi-function device such as a combination copier, scanner, fax machine, etc (e.g., rendering device 30 depicted in FIG. 1). Note that as utilized herein the term "multi-function device" generally refers to any type of a MFP (Multi Function Printer/Product/Peripheral), multi-functional, all-in-one (AiO), mopier (Multiple Optical copier), or Multifunction Device (MFD), which is an office machine that incorporates the functionality of multiple devices in one, so as to have a smaller footprint in a home or small business setting, or to provide centralized document management/distribution/production in a large-office setting. A typical MFP or multi-function device may act as a combination of some or all of the following devices: printer, scanner, copier, fax machine, telephone, etc.

Figure 4:
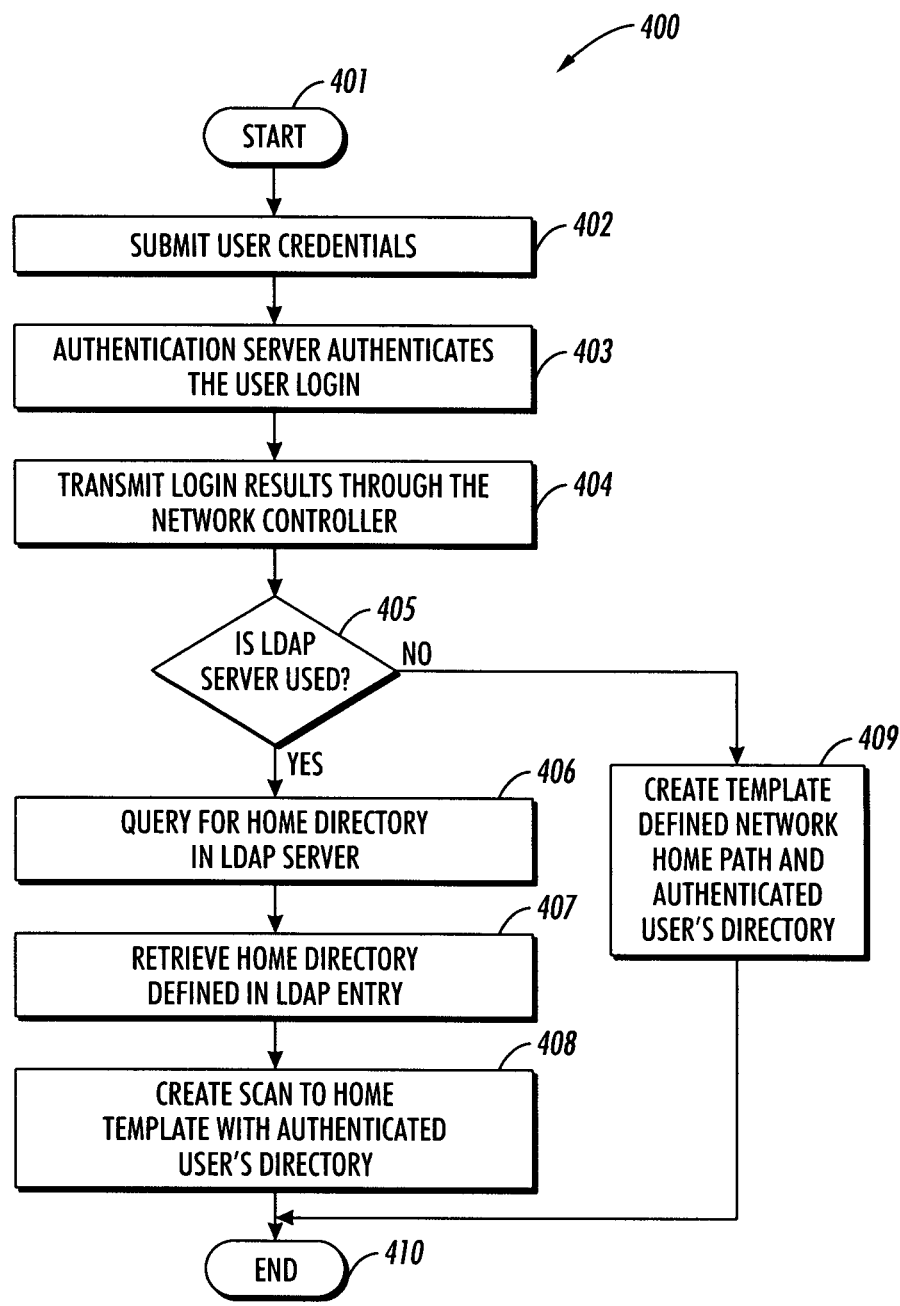
FIG. 4 illustrates a high-level flow chart of logical operational steps of a method, which can be implemented in accordance with an alternative embodiment.

FIG. 4 illustrates a high-level flow chart of operations depicting logical operational steps of a method 400, for scan-to-home feature in accordance with an alternative embodiment. As depicted at block 401, the process can begin. Next, as indicated at block 402, the user submits electronic credentials. Thereafter, as described at block 403, the user logs into the device and can be authenticated by the authentication server 205. Next, as depicted at block 404, the authentication sever 205 can send login results through the network controller 203. Thereafter, as illustrated at block 405, a test can be processed to determine if a customer environment (i.e., the "environment" associated with the user) utilizes the LDAP server 207.

If the answer is "Yes" then as indicated at block 406, a query can be sent with respect to a home directory in or associated with the LDAP server 207. The home directory is defined in an LDAP entry associated with the LDAP server 207. Next, as depicted at block 407 the home directory defined in the LDAP entry can be retrieved. Thereafter, as described at block 408, an operation can be implemented for automatically creating the scan-to-home template with the authenticated user's home directory as the file destination. Otherwise, as indicated at block 409, the scan-to-home template can be constructed with a defined Network Home Path and the authenticated user's directory. Finally, as indicated at block 410, the process can terminate.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electronic document storage and rendering method, comprising:
    authenticating a user and electronic credentials associated with said user;
    searching for a LDAP server in an environment associated with said user, wherein if said LDAP server is found, a home directory associated with said user is retrieved from said LDAP server, and wherein if said LDAP server is not found, a network home path is defined utilizing a user interface and a login name associated with said user is appended to said home path;
    thereafter creating a scan-to-home template based on said electronic credentials, if said user is authenticated, wherein said template is graphically displayable as a single template in a display area of a user interface and is populated with information specific to said user; and
    automatically delivering and storing said electronic document to said home directory or home path, in response to a selection of said single template by said user utilizing said user interface.

2. The method of claim 1 further comprising updating said single template with said electronic credentials associated with said user.

3. The method of claim 1 wherein authenticating a user and generating electronic credentials associated with said user, further comprises:
    granting said user access to a multi-function device, if said user provides an authenticated login name and password.

4. The method of claim 1 further comprising graphically displaying said template for said user within said display area of said user interface.

5. The method of claim 1 wherein authenticating said user further comprises:
    submitting said electronic credentials associated with said user utilizing a local user interface;
    logging into a computing device utilizing a login name and a password associated with said user;
    authenticating said user utilizing an authentication server and generating login results thereof; and
    authorizing said login results through a computer network associated with said authentication server.

6. The method of claim 1 further comprising enabling or disabling said Scan-to-Home template from said user interface.

7. An electronic document storage and rendering system, comprising:
    a data-processing apparatus;

a module executed by said data-processing apparatus, said
module and said data-processing apparatus being operable in combination with one another to:
  authenticate a user and electronic credentials associated with said user;
  searching for a LDAP server in an environment associated with said user, wherein if said LDAP server is found, a home directory associated with said user is retrieved from said LDAP server, and wherein if said LDAP server is not found, a network home path is defined utilizing a user interface and a login name associated with said user is appended to said home path;
  thereafter create a scan-to-home template based on said electronic credentials, if said user is authenticated, wherein said template is graphically displayable as a single template in a display area of a user interface and is populated with information specific to said user; and
  automatically deliver and store said electronic document to said home directory or home path, in response to a selection of said single template by said user utilizing said user interface.

8. The system of claim 7 wherein said module and said data-processing apparatus are further operable in combination with one another to update said single template with said electronic credentials associated with said user.

9. The system of claim 7 wherein said module and said data-processing apparatus operable in combination with one another to authenticate a user and generating electronic credentials associated with said user, are further operable in combination with one another to:
  grant said user access to a multi-function device, if said user provides an authenticated login name and password.

10. The system of claim 7 wherein said module and said data-processing apparatus are further operable in combination with one another to graphically display said template for said user within said display area of said user interface.

11. The system of claim 7 wherein said module and said data-processing apparatus operable in combination with one another to authenticate said user are further operable in combination with one another to:
  submit said electronic credentials associated with said user utilizing a local user interface;
  log into a computing device utilizing a login name and a password associated with said user;
  authenticate said user utilizing an authentication server and generating login results thereof; and
  authorize said login results through a computer network associated with said authentication server.

12. The system of claim 7 wherein said module and said data-processing apparatus are further operable in combination with one another to enable or disable said Scan-to-Home template from said user interface.

13. The system of claim 7 wherein said module and said data-processing apparatus operable in combination with one another to authenticate said user are further operable in combination with one another to:
  submit said electronic credentials associated with said user utilizing a local user interface;
  log into a computing device utilizing a login name and a password associated with said user;
  authenticate said user utilizing an authentication server and generating login results thereof;
  authorize said login results through a computer network associated with said authentication server; and
  wherein said module and said data-processing apparatus are further operable in combination with one another to:
  search for an LDAP server in an environment associated with said user;
  find said LDAP server employed in said environment associated with said user, wherein an LDAP entry is associated with said LDAP server;
  retrieve said home directory, wherein said home directory is defined in said LDAP entry; and
  create said template utilizing said home directory, if said home directory is authenticated and associated with said user.

14. A computer program product, stored on one or more non-transitory machine-readable storage media, comprising instructions configured for:
  authenticating a user and electronic credentials associated with said user;
  searching for a LDAP server in an environment associated with said user, wherein if said LDAP server is found, a home directory associated with said user is retrieved from said LDAP server, and wherein if said LDAP server is not found, a network home path is defined utilizing a user interface and a login name associated with said user is appended to said home path;
  thereafter creating a template based on said electronic credentials, if said user is authenticated, wherein said template is graphically displayable as a single template in a display area of a user interface and is populated with information specific to said user; and
  automatically delivering and storing said electronic document to said home directory or home path, in response to a selection of said single template by said user utilizing said user interface.

* * * * *